Sept. 3, 1940.  R. R. LISBON  2,213,653
CHUCK
Filed Oct. 1, 1938
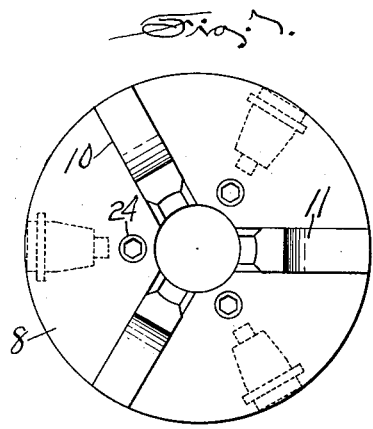
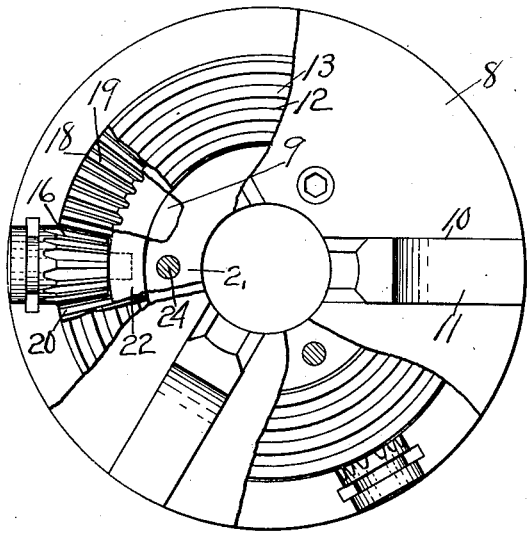
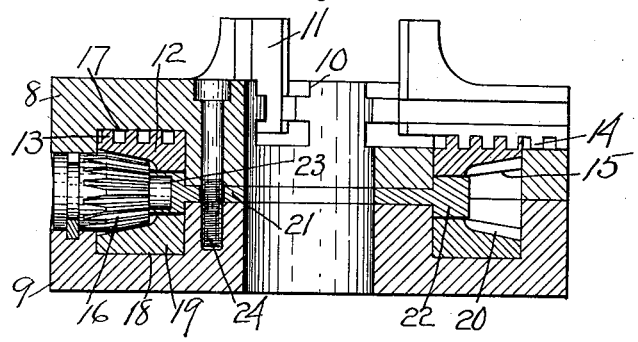
INVENTOR
Robert R. Lisbon,
by
Arthur B. Jenkins.
ATTORNEY Patented Sept. 3, 1940

2,213,653

UNITED STATES PATENT OFFICE 2,213,653

CHUCK

Robert R. Lisbon, Hartford, Conn., assignor to The Union Manufacturing Company, New Britain, Conn., a corporation of Connecticut Application October 1, 1938, Serial No. 232,792

3 Claims. (Cl. 279—116)

My invention relates to the class of devices which are employed for holding pieces of work for cutting operations thereon by tools employed for the purpose, the chuck being usually but not always rotated to create a cutting action by the tools, and an object of my invention, among others, is the production of a chuck of the scroll type of simple and durable construction and having means for enabling a maximum grip to be obtained upon a piece of work with the expenditure of a minimum amount of force.

One form of a chuck embodying my invention and in the construction and use of which the objects herein set out, as well as others, may be attained is illustrated in the accompanying drawing in which—

Figure 1 is a front face view of a chuck embodying my invention.

Figure 2 is a front face view on enlarged scale of my improved chuck with parts broken away to show construction.

Figure 3 is a view in central axial section through the chuck.

To hold work securely without slipping, modern scroll chucks have to be tightened to much greater pressures on the work than formerly, due to the much greater speeds, feeds, and power used by modern machines, as a result of larger use of alloy steels, high speed steel tools, tungsten carbide and so forth, and the urgent need for rapid production.

It has not been easy to secure this needed pressure in the ordinary design of scroll chuck, especially in those intended for heavy duty, because of the natural tendency of the scroll plate to be crowded away from the pinion through which pressure is being applied, thus tending to distort the scroll plate and to cause friction and cramping where the scroll plate revolves on the center hub, and also between the scroll proper and the teeth on the underside of the jaws. This difficulty is generally recognized and the attempt is commonly made by chuck users to lessen it by tightening one pinion after another around the chuck, but this is apt to result in distortion remaining where pressure was last applied.

The object of my invention is to produce a balanced pressure on the scroll plate to prevent this distortion, uneven strain, and consequent friction, and thereby allow the scroll plate to transmit much greater pressure and more even pressure to the jaws and to the work being held, requiring less effort to tighten the jaws and consequently causing less wear, resulting in longer life and enduring accuracy.

I accomplish this result by supporting the scroll plate and pinions in a way to prevent distortion of the scroll, as described hereinafter.

My invention is more especially applicable to a chuck of the so-called scroll type employing a number of jaws radially movable on the chuck body, such a chuck embodying my invention being shown in the drawing herein which comprises a chuck body composed of two parts, a front face plate 8 and a back plate 9. The front face plate is of a structure very similar to those in common use at the present time, having radial grooves 10 of any desired number, three being shown herein, in which chuck jaws 11 are radially movable as by means of an operating scroll plate 12 having a scroll 13 on one side engaged by teeth 14 of scroll formation on the under surfaces of the chuck jaws 11. On the opposite face of the scroll plate from the scroll 13 rack teeth 15 are formed to mesh with the members of a set of beveled pinions 16 of any suitable number disposed around the chuck within the body, three of said pinions being shown herein. The scroll plate 12 is of annular form and is located in a groove 17 in the under surface of the front face plate 8 as shown in Fig. 3 of the drawing. All of the parts thus far described are of old and well known construction and, except in connection with other parts now to be explained, comprise no part of my invention.

The back plate has an annular groove 18 formed therein and a stabilizing plate 19, of annular form, is fitted to ride in said groove, said stabilizing plate having teeth to mesh with the teeth of the pinions 16, as shown in Fig. 3 of the drawing.

A supporting plate 21 having a thickened edge 22 is secured between the front and back plates against rotation, said edge having holes for the reception of studs 23 projecting from the back ends of the pinions 16. These pinions may have sockets in their front ends each to receive a wrench in a manner common to chucks of this type.

The plate 19 stabilizes the action of the pinions and the scroll plate to produce a free and steady movement without cramping action. This plate is held stationary within the chuck body as by means of screws 24 of any suitable number, of the socketed type as herein shown, extending from and through the front plate 8 into the back plate and for the purpose of securing said two plates together.

In accordance with the provisions of the patent statutes I have described the principles of operation of my invention, together with the device which I now consider to represent the best embodiment thereof; but I desire to have it understood that the device shown is only illustrative and that the invention may be carried out by other means and applied to uses other than those above set out.

I claim:

1. A chuck including a body comprising a front face plate and a back plate, said body having an annular groove therein, a supporting plate secured against rotation between said front and back plates and having a thickened edge located within said groove, pinions located in said groove and having their ends supported in recesses in the thickened edge of said supporting plate, means for rotating said pinions by force applied directly thereto, a stabilizing plate mounted in said groove for floating movement therein effected solely by said pinions to absorb force applied to said pinions and having rack teeth engaged by the teeth of said pinion, a scroll plate rotatably mounted in said groove on the opposite side of the pinion from said stabilizing plate and having a scroll on its opposite face from said teeth, and chuck jaws mounted in radial grooves in said body and having teeth engaged with said scroll.

2. A chuck comprising a body including a front face plate and a back plate having an annular groove between them, a supporting plate secured against rotation between said front and back plates and having an annular thickened edge located in said groove and having a number of recesses, pinions located in said grooves and having stubs extending into said recesses, means for rotating said pinions by force applied directly thereto, a stabilizing plate mounted in said groove for floating movement therein effected solely by said pinions to absorb force applied to said pinions on one side of each, a scroll plate rotatably mounted in said groove on the opposite side of said pinions both of said plates having teeth engaged by the teeth of said pinions and said scroll plate having a scroll on the opposite face from said pinions, and chuck jaws mounted in radial grooves in the front face plate and having teeth engaged by said scroll.

3. A chuck comprising a body including a front face plate and a back plate having an annular groove between them, a supporting plate comprising a flange clamped between said face and back plates and having a thickened edge housed in said groove with recesses therein, pinions extending into said recesses and having means for application of force applied directly thereto to initially operate jaws on said chuck, a scroll plate rotatably mounted in said groove on one side of said pinions and engaged therewith, a stabilizing plate completely housed in said groove on the opposite sides of said pinions and engaged therewith, said stabilizing plate having unrestricted rotation to absorb force applied thereto by said pinions and means for retaining the pinions in a stationary position.

ROBERT R. LISBON.